(12) United States Patent
Sullenberger et al.

(10) Patent No.: US 9,998,428 B2
(45) Date of Patent: Jun. 12, 2018

(54) VIRTUAL ROUTING AND FORWARDING (VRF) FOR ASYMMETRICAL VIRTUAL SERVICE PROVIDER (VSP) TUNNELS

(71) Applicant: Cisco Technology, Inc., San Jose, CA (US)

(72) Inventors: Michael L. Sullenberger, San Jose, CA (US); Manish Kumar, Jharkhand (IN); Eitan Ben-Nun, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 346 days.

(21) Appl. No.: 14/753,172

(22) Filed: Jun. 29, 2015

(65) Prior Publication Data
US 2016/0380973 A1    Dec. 29, 2016

(51) Int. Cl.
*H04L 29/06* (2006.01)

(52) U.S. Cl.
CPC ........ *H04L 63/0272* (2013.01); *H04L 63/029* (2013.01)

(58) Field of Classification Search
None
See application file for complete search history.

(56) References Cited

U.S. PATENT DOCUMENTS

| | | | |
|---|---|---|---|
| 4,905,233 A * | 2/1990 | Cain | H04L 45/00 370/237 |
| 7,804,766 B2 | 9/2010 | Qian et al. | |
| 7,912,445 B2 | 3/2011 | Maes | |
| 7,957,408 B2 | 6/2011 | Guichard et al. | |
| 8,730,967 B1 | 5/2014 | Arad | |
| 2001/0046227 A1* | 11/2001 | Matsuhira | H04L 45/00 370/355 |
| 2003/0012178 A1* | 1/2003 | Mussman | H04L 29/06027 370/352 |
| 2003/0051048 A1* | 3/2003 | Watson | H04L 45/00 709/238 |
| 2003/0142633 A1* | 7/2003 | Wall | H04L 12/56 370/254 |
| 2004/0001497 A1* | 1/2004 | Sharma | H04L 45/02 370/401 |
| 2005/0102414 A1* | 5/2005 | Hares | H04L 45/00 709/232 |
| 2005/0243817 A1* | 11/2005 | Wrenn | H04L 45/00 370/389 |
| 2010/0192207 A1 | 7/2010 | Raleigh | |
| 2012/0284699 A1* | 11/2012 | Van Der Merwe | G06F 11/3636 717/129 |
| 2016/0197886 A1* | 7/2016 | Lapidous | H04L 63/0428 713/168 |

* cited by examiner

*Primary Examiner* — William J. Goodchild
(74) *Attorney, Agent, or Firm* — Parker Ibrahim & Berg LLP; James M. Behmke; Stephen D. LeBarron

(57) ABSTRACT

In one embodiment, a device in a network maintains first and second routing tables associated with a virtual private network (VPN) tunnel. The first and second routing tables comprise routing information used to route packets external to a particular routing domain. The device routes a first packet in the network via the VPN tunnel and a second tunnel that encapsulates the VPN tunnel, using the routing information in the first routing table. The device receives a second packet via the VPN tunnel that was routed to the device using the routing information in the second routing table and bypasses the second tunnel.

17 Claims, 11 Drawing Sheets

VIRTUAL ROUTING AND FORWARDING (VRF) FOR ASYMMETRICAL VIRTUAL SERVICE PROVIDER (VSP) TUNNELS

TECHNICAL FIELD

The present disclosure relates generally to computer networks, and, more particularly, to providing virtual routing and forwarding (VRF) for asymmetrical virtual service provider (VSP) tunnels.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

Some enterprise networks are now also leveraging the use of virtual service platforms (VSP). In general, VSPs are virtual entities within a computer network that provide particular services for the enterprise. For example, traffic within the network may be routed through a particular VSP for purposes of performing security functions, caching, analytics, etc. Typically, such traffic is sent via a virtual private network (VPN) tunnel with the VSP.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network maintains first and second routing tables associated with a virtual private network (VPN) tunnel. The first and second routing tables comprise routing information used to route packets external to a particular routing domain. The device routes a first packet in the network via the VPN tunnel and a second tunnel that encapsulates the VPN tunnel, using the routing information in the first routing table. The device receives a second packet via the VPN tunnel that was routed to the device using the routing information in the second routing table and bypasses the second tunnel.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
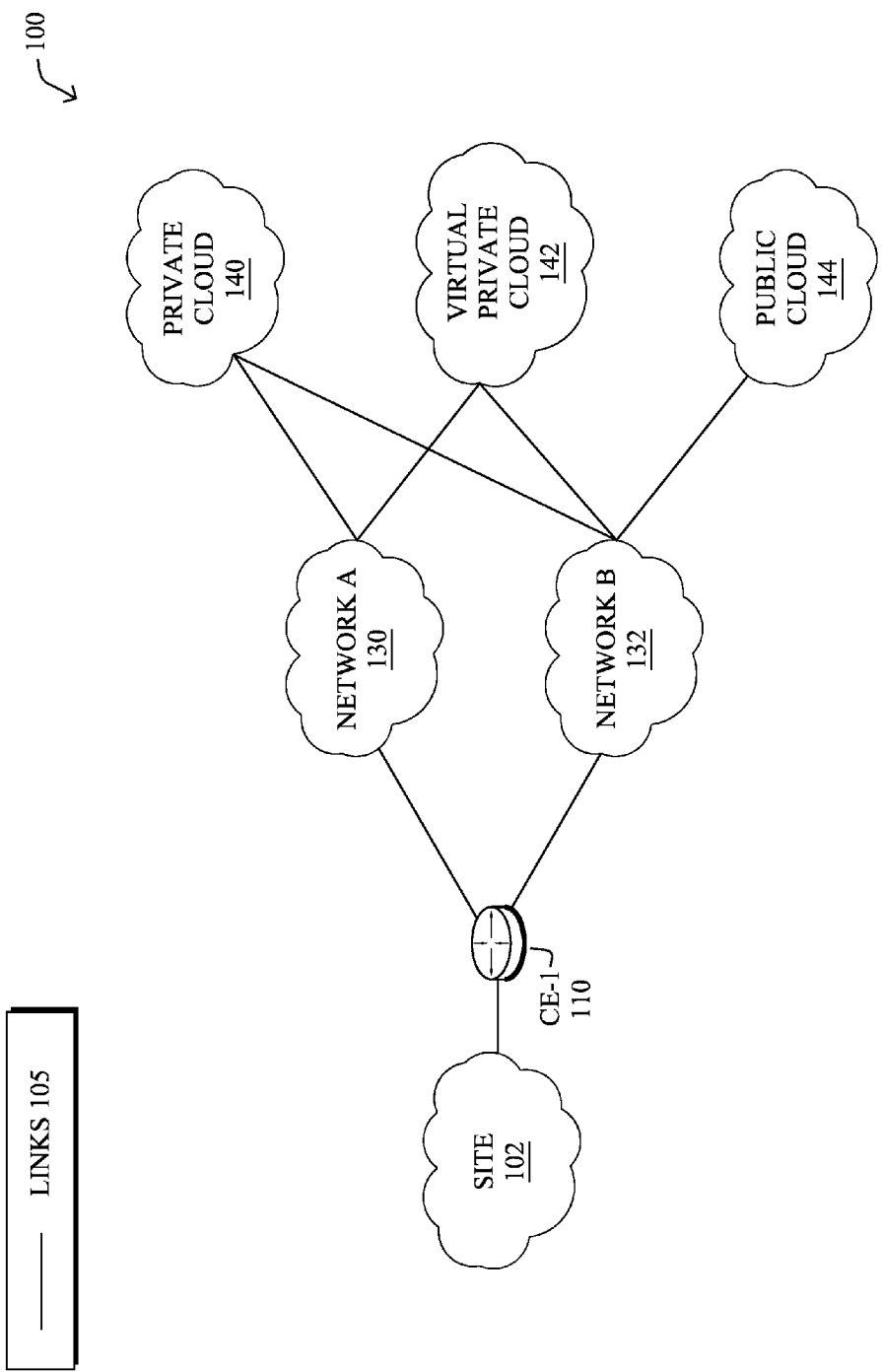
FIG. 1 illustrates an example communication system.

FIG. 1 is a schematic block diagram of an example communication system 100, according to various embodiments. As shown, a site 102 (e.g., a branch of an enterprise network, etc.) may connect the various computing devices located at site 102 (e.g., a LAN of devices) to various remote devices/services via one or more customer edge (CE) routers 110 and links 105. Such remote devices/services may exist within a private cloud 140, a virtual private cloud 142, a public cloud 144, or the like. In general, one or more CE routers 110 (e.g., router CE-1, etc.), may provide connectivity between devices on one or more LANs of site 102 with the devices/services associated with clouds 140-144. For example, public cloud 144 may include a publicly available web server, whereas private cloud 140 may include a server located within a data center operated by the same entity associated with site 102.

Data packets (e.g., traffic/messages) may be exchanged among the nodes/devices of the communication system 100 over links 105 using predefined network communication protocols such as TCP/IP, User Datagram Protocol (UDP), Asynchronous Transfer Mode (ATM) protocol, Frame Relay protocol, or any other suitable protocol. Those skilled in the art will understand that any number of nodes, devices, links, etc. may be used in the system, and that the view shown herein is for simplicity.

A particular site may be connected to clouds 140, 142, and/or 144 via any number of different core networks. For example, as shown, site 102 may be connected to a first network 130 and also to a second network 132, the links to which may exhibit very different network service level agreement (SLA) characteristics. Connections between site 102 and networks 130-132 may comprise, in various embodiments, public Internet connections, multiprotocol label switching (MPLS) networks, or the like. In one embodiment, networks 130, 132 may even be associated with different service providers.

For the sake of illustration, a given site may fall under any of the following categories:

1.) Site Type A: a site connected using a private or virtual private network (VPN) link via a single CE router and a single link, with potentially a backup link (e.g., a 3G/4G/LTE backup connection). For example, CE-1 shown may support site 102 via a link to network 130 (e.g., an MPLS network), potentially also with a backup network connection via a cellular wireless connection.

2.) Site Type B: a site connected using two VPN links (e.g., from different service providers), with potentially a backup link (e.g., a 3G/4G/LTE connection). In one example, dynamic tunneling techniques, such as Dynamic Multipoint Virtual Private Network (DMVPN) by Cisco Systems, Inc., or the like, may be used to dynamically build VPN tunnels over one or more MPLS networks, one or more Internet connections, etc. A site of type B may itself be of different types:

2a.) Site Type B1: a site connected using two MPLS VPN links (e.g., from different service providers), with potentially a backup link (e.g., a 3G/4G/LTE connection). For example, networks 130 and 132 may be different MPLS networks, in one embodiment.

2b.) Site Type B2: a site connected to the network using one MPLS VPN link and one link connected to the public Internet, with potentially a backup link (e.g., a 3G/4G/LTE connection). For example, network 130 may be an MPLS network, whereas the connection to network 132 may be a public Internet connection, potentially also with a cellular wireless backup link.

2c.) Site Type B3: a site connected to the network using two links connected to the public Internet (e.g., via different service providers), with potentially one or more backup links (e.g., a 3G/4G/LTE connection). For example, the connections between CE-1 and both of networks 130, 132 may be public Internet connections via different service providers.

As would be appreciated, MPLS VPN links are usually tied to a committed SLA, whereas Internet links may either have no SLA at all or a loose SLA (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one network while a second CE router is connected to the other network), with potentially one or more backup links (e.g., a wireless 3G/4G/LTE backup link). For example, site 102 may include a first CE router 110 connected to network 130 and a second CE router 110 connected to network 132, in another embodiment.

Any number of devices, configurations, and network connections may be used to provide remote communications to and from a given site. Further, while certain topologies are depicted, such as with a site connected to different service provider networks, other topologies may be used in other embodiments (e.g., site 102 may be connected to three different service provider networks, four different networks, etc.).

To ensure that certain degrees of performance are met for the network traffic, the various devices in system 100 may employ any or all of the following mechanisms:

Application Visibility and Control (AVC): this mechanism incorporates into the routing devices application recognition and performance monitoring capabilities traditionally available only as dedicated devices. For example, router CE-1 at site 102 shown may be configured to support AVC. In general, AVC allows application awareness to be built into the network infrastructure, plus visibility into the performance of applications running on the network. AVC also allows for enabling of per-application policy for granular control of application bandwidth usage. A typical AVC implementation may perform the following: application recognition, metrics collection and reporting, and management/control. For example, CE-1 may use Network Based Application Recognition (NBAR) by Cisco Systems, Inc., or a similar mechanism (e.g., by using deep packet inspection, etc.), to associate traffic flows with specific applications. Collected performance metrics such as packet loss, bandwidth usage, etc., may be associated with the identified applications at the router and then reported to a supervisory device, which may make any number of adjustments to the network, in response. The AVC mechanism may further operate in conjunction with a traffic flow analysis and reporting mechanism operable to distinguish between traffic flows and provide summarized reports to a supervisory device. An example of such a mechanism is NetFlow by Cisco Systems, Inc.

Performance Routing (PfR): this mechanism allows traffic to be automatically switched between multiple paths based on configured thresholds for network attributes such as delay, jitter, and loss. These attributes may be tracked using probes that are generated for each DSCP, source-destination tuple, etc. Also, these configured thresholds are based on the perceived tolerance of applications that are being sent over the network. Once these thresholds are crossed (e.g., if the delay increases from than 50 ms or the jitter increases by 5%), threshold crossing alerts may be sent out based on which the traffic is switched over to alternate and pre-configured paths. Once traffic has been moved, probes may continue to be sent out and after a pre-configured time period, based on the probe measurements, traffic is reverted to the original path. For example, assume that network 130 is an MPLS network and that network 132 provides an Internet connection to site 102. In such a case, CE-1 may use PfR to switch between communicating with a data center in private cloud 140 via networks 130 and 132, depending on the measured characteristics of the network and the policy-defined requirements for the specific network traffic.

These and other mechanisms may be used within a network such as communication system 100 to ensure that certain SLAs are met for a given application. For example, a supervisory application policy infrastructure controller (APIC) may operate as a policy engine that works in conjunction with the monitoring/reporting mechanisms local to the deployed routers, to ensure that traffic for a particular application experiences a desired level of performance.

Numerous types of application traffic may be flowing through current day networks. For example, a particular CE router 110 located at a customer site may provide and receive different forms of application traffic that is communicated through communication system 100. For example, traffic associated with a given customer site may include, but is not limited to, video data (e.g., video conferencing data), audio data (e.g., voice-over-IP (VoIP)), enterprise resource planning (ERP) data, customer relationship management (CRM) data, and the like. Each form of traffic may have specific network requirements and may be very demanding with respect to network availability and resiliency, such that even small deviations in network conditions may render an application incapable of providing the requisite experience to the end user. For example, low network performance may result in a video conference appearing choppy to the end users.

Figure 2:
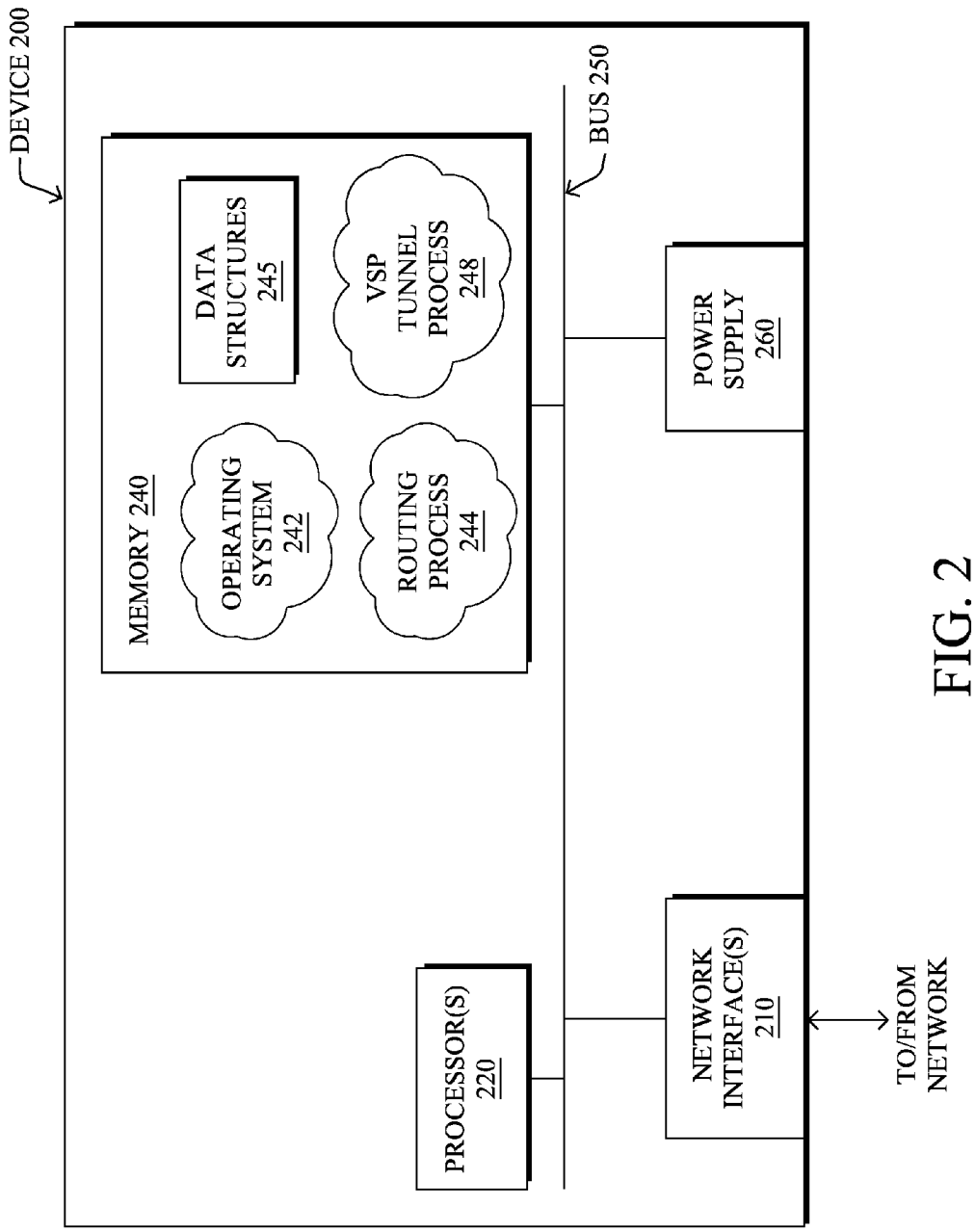
FIG. 2 illustrates an example network device/node.

FIG. 2 is a schematic block diagram of an example node/device 200 that may be used with one or more embodiments described herein, e.g., as any of the devices associated with system 100 (e.g., a router, switch, etc.), any other computing device that supports the operations of system 100 (e.g., servers, network controllers, etc.), or any of the other devices referenced below. The device 200 may also be any other suitable type of device depending upon the type of network architecture in place. Device 200 generally comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the communication system 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a virtual service platform (VSP) tunnel process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols or tunneling protocols, such as for MPLS, generalized MPLS (GMPLS), etc., each as will be understood by those skilled in the art. In one embodiment, routing process 244 may be operable to establish dynamic VPN tunnels, such as by using a DMVPN overlay onto the network. In some embodiments, routing process 244 may be operable to use virtual routing and forwarding (VRF) instances. In general, VRF instances allow for different paths to be isolated by the device. Notably, each VRF instance may use separate routing tables, forwarding tables, polices, etc., allowing for each VRF instance to be handled separately by the device, in a virtual manner.

Routing process/services 244 may further be configured to perform additional functions such as security functions, firewall functions, AVC or similar functions, reporting and/or monitoring functions, PfR or similar functions, combinations thereof, or the like. As would be appreciated, routing process/services 244 may be configured to perform any of its respective functions independently or in conjunction with one or more other devices. In other words, in some cases, device 200 may provide supervisory control over the operations of one or more other devices. In other cases, device 200 may be controlled in part by another device that provides supervisory control over the operations of device 200.

Figure 3A:
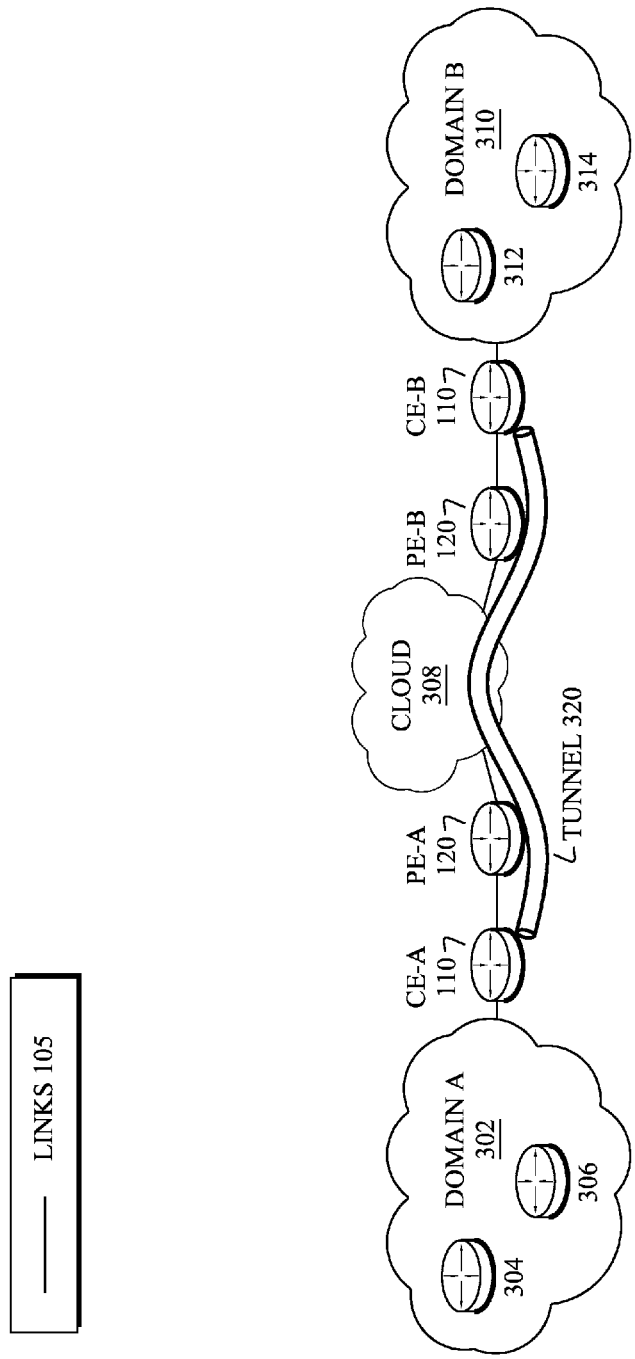
FIGS. 3A-3B illustrate an example of traffic being sent within a communication system.

As noted above, VPN tunnels may be created between separate network domains, such as a local domain and a remote domain. As shown in FIG. 3A, assume that a first networking domain 302 (e.g., domain "A") includes any number of computing devices 304-306 that are addressed within domain 302. For example, domain 302 may be located at a network branch/site (e.g., site 102, etc.), data center or cloud environment, or the like. Similarly, remote domain 310 (e.g., domain "B") may include devices 312-314 that are addressed on the local domain B.

CE routers 110 may facilitate inter-domain communications between the devices of domains 302 and 310. For example, domain 302 may have one or more CE routers 110 (e.g., router CE-A) in communication with one or more provider edge (PE) routers 120 (e.g., a router PE-A) of a provider network (e.g., network 130, network 132, etc.). Similarly, domain 310 may have one or more CE routers 110 (e.g., router CE-B) in communication with one or more PE routers 120 (e.g., PE-B). PE routers 120 may be communicatively connected via a cloud/network 308. As would be appreciated, network 308 may be operated by the same service provider as that of PE-A and PE-B or may span networks operated by multiple service providers (e.g., CE-A and CE-B are connected via the Internet through different service providers, etc.).

As shown, tunnel 320 may be established between CE-A and CE-B via which communications between domains 302 and 310 may be sent. For example, tunnel 320 may be a DMVPN multipoint, bi-directional tunnel or any other form of tunnel (e.g., IPSEC, etc.) between domains A and B.

In many cases, a service provider (SP) may perform network address translation (NAT), to transform an internal address (e.g., within domain A) into a global address seen by the WAN/cloud network 308. In these instances, the SP-NAT (e.g., PE-A, a device associated with PE-A, etc.) may receive a packet from domain A via CE-A. In response, the SP-NAT may translate a source address X from domain A into a global address X' before sending the packet towards domain B via cloud network 308. In the reverse, the translated address X' may be used by the device(s) of domain B (e.g., CE-B, etc.), so that when a packet is sent from domain B to domain A, the SP-NAT can translate the global destination address X' back into the internal address X of domain A. Note that this initial tunnel (e.g., tunnel 320) may be set up between domain A and domain B specifically between two border routers (e.g., CE-A and CE-B), such that the two border routers view each other as end-points of this initial tunnel, and CE-B notably sees address X' for CE-A.

In some cases, a network may employ the use of one or more virtual service platforms (VSPs) to process traffic between domains (e.g., a router associated with the VSP). In general, a VSP similar to a regular Internet Service Provider (ISP) in that it is providing network services for end nodes (e.g., content caching, security operations, etc.), but may differ in that the VSP doesn't own or directly lease the physical connection to the endpoints (EPs) on the Internet for which it is providing services. An EP that is using a VSP will also have an ISP for its physical network connection, but then use tunneling to tunnel the data traffic (packets) to the VSP over their ISP's network. In this case, the ISP is only providing access to and from the VSP and the VSP is providing access to and from all other EPs on the Internet.

An example of an arrangement with a VSP is an IPv6 VSP. In this case, the EP may be connected to an IPv4 ISP, but need IPv6 services. The EP may arrange to use an IPv6 VSP and tunnel its IPv6 traffic over an IPv4 tunnel (e.g., over the IPv4 ISP) to the IPv6 VSP. The IPv4 ISP itself cannot provide IPv6 services, but since it is providing the physical access to the Internet, the ISP may be used (e.g., tunneled over) to reach the IPv6 VSP that is providing the IPv6 services.

Figure 3B:
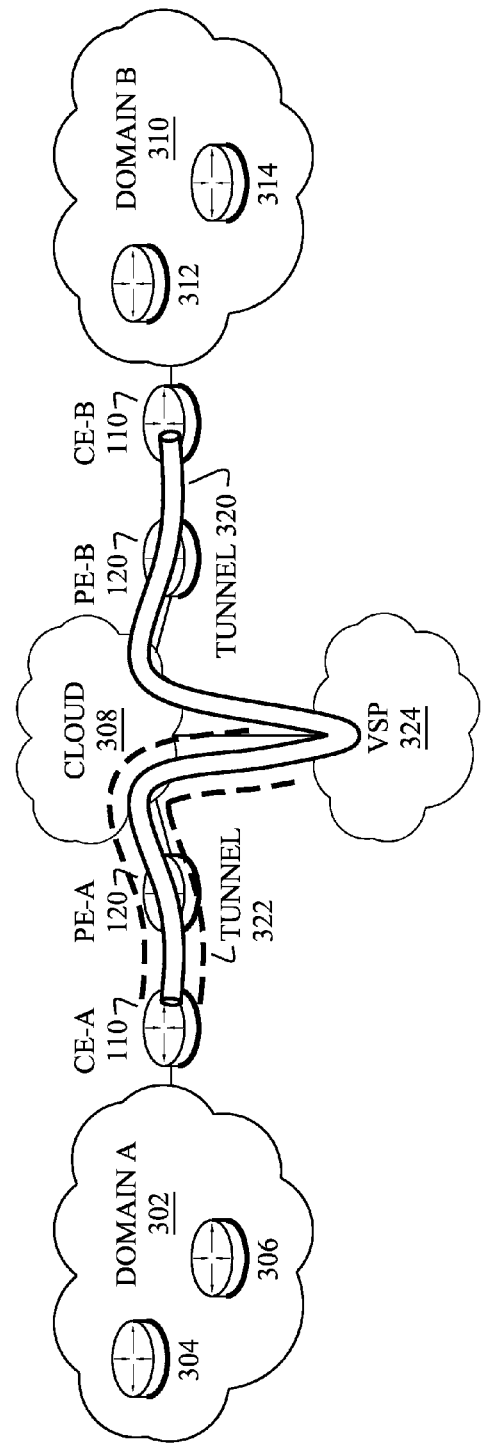

Referring now to FIG. 3B, assume that some or all of the traffic communicated between domains A and B of FIG. 3A are to be send via a VSP 324 (e.g., for purposes of performing caching operations, security operations, etc.). In such cases, the initial tunnel 320 may be established first between domains A and B, as described above. Once established, a second, redirecting tunnel 322 (e.g., an IPSEC tunnel, etc.) may be established between CE-A and VSP 324. In other words, the initial tunnel 320 between domains A and B may be encapsulated within a second tunnel 322 that directs the traffic of tunnel 320 through VSP 324.

In response to receiving a tunnel-in-tunnel packet from CE-A, the receiving device associated with VSP 324 may decapsulate the packet from the outer tunnel (e.g., tunnel 322), to reveal the packet still encapsulated for the inner tunnel 320. The device may then process the decapsulated traffic, which is still encapsulated for tunnel 320, and forward the traffic along to the destination of tunnel 320 (e.g., CE-B).

While the use of VSPs may provide certain services for network traffic, the use of a separate tunnel to the VSP for VPN traffic may also present certain challenges. Notably, in the case of asymmetrical VSP tunnels (e.g., traffic flowing in one direction is sent via the VSP, but is sent directly in the opposite direction), address discrepancies may result between the routing tables of the various networking devices.

Virtual Routing and Forwarding for Asymmetrical VSP Tunnels

The techniques herein support VRF instances when asymmetrical tunnels are used, such as asymmetrical tunnels used to send traffic (e.g., VPN traffic) via a VSP. In some aspects, separate routing tables/VRF instances may be created, to accommodate the asymmetrical tunnels. For example, an outbound or inbound command line key may be used to decouple the external interface from the front door VRF (fVRF) (e.g., "tunnel VRF VSP outbound," "tunnel VRF VSP inbound," etc.), thereby forming a separation between the external interface entry and the fVRF, allowing for asymmetrical tunnel operations without the potential for conflicts.

Specifically, according to one or more embodiments, a device in a network maintains first and second routing tables associated with a virtual private network (VPN) tunnel. The first and second routing tables comprise routing information used to route packets external to a particular routing domain. The device routes a first packet in the network via the VPN tunnel and a second tunnel that encapsulates the VPN tunnel using the routing information in the first routing table. The device receives a second packet via the VPN tunnel that was routed to the device using the routing information in the second routing table and bypasses the second tunnel.

Illustratively, the techniques described herein may be performed by hardware, software, and/or firmware, such as in accordance with the VSP tunnel process 248, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols and as such, may be processed by similar components understood in the art that execute those protocols, accordingly.

Figure 4A:
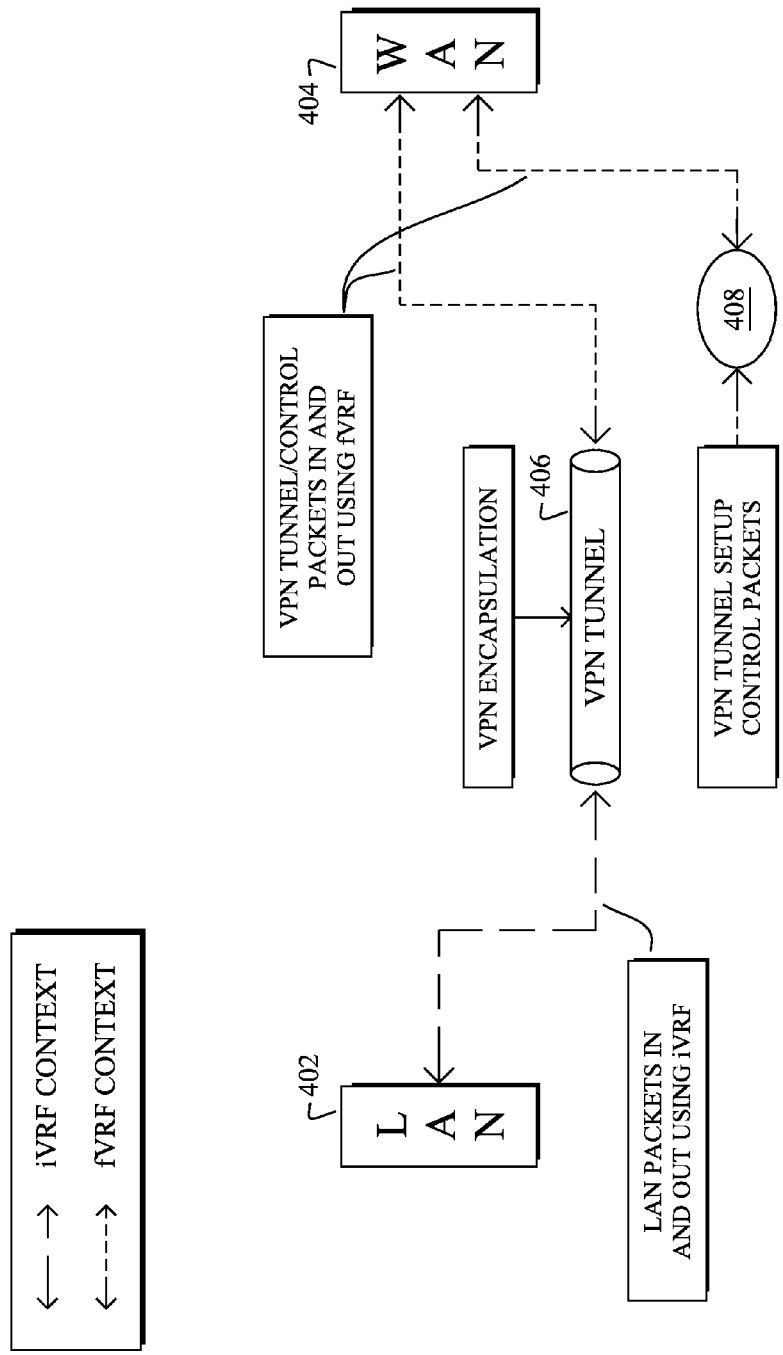
FIGS. 4A-4E illustrate examples of tunnels being used in a communication system.

Operationally, various examples of different tunnel configurations are shown in FIGS. 4A-4E, according to various embodiments. As shown in FIG. 4A, a networking device (e.g., a router, etc.) may route traffic to and from a LAN 402 and a WAN 404. For example, router CE-A shown in FIGS. 3A-3B may border local domain 302 (e.g., a LAN) and cloud 308 (e.g., a WAN), such as the Internet. Such a device may communicate with a remote device/network via a VPN tunnel 406.

To treat the internal routes (e.g., those within LAN 402) and external routes (e.g., those within WAN 404) separately, the device may maintain separate VRF contexts. Notably, for routing devices at the edge of a network domain participating in a VPN, such as a border router, the VPN tunnel traversed by the traffic (e.g., tunnel 406) may have an externally facing tunnel interface that is typically configured with two sides: an internal/VPN passenger side of the VPN tunnel interface and an external/transport side of the VPN tunnel interface. In various embodiments, the device may maintain separate VRF instances and have separate VRF tables: an internal VRF (iVRF) on the VPN side and a front-door VRF (fVRF) on the transport side. The device may use the different VRFs to separate the passenger packets going over the VPN from that of the VPN tunnel transport packets going over the ISP/physical network (e.g., the passenger packet is inside the VPN tunnel transport packet). For example, as shown in FIG. 4A, the device may use the iVRF context (e.g., iVRF routing table) when communicating with the devices in LAN 402. On the WAN side, the device may instead use the corresponding fVRF context to communicate packets encapsulated within VPN tunnel 406 and the setup/control packets 408 associated with VPN tunnel 406, to an endpoint of VPN tunnel 406.

In the configuration shown, the entry for VPN tunnel 406, and the external physical transport interface over which VPN tunnel 406 forwards packets outbound, must be in the same fVRF. Also the tunnel transport packets that are received inbound must arrive on an external transport interface in this same fVRF. There are normally no issues in this configuration when sending and receiving VPN tunnel packets, when the border router is directly connected to an ISP over physical interfaces.

Figure 4B:
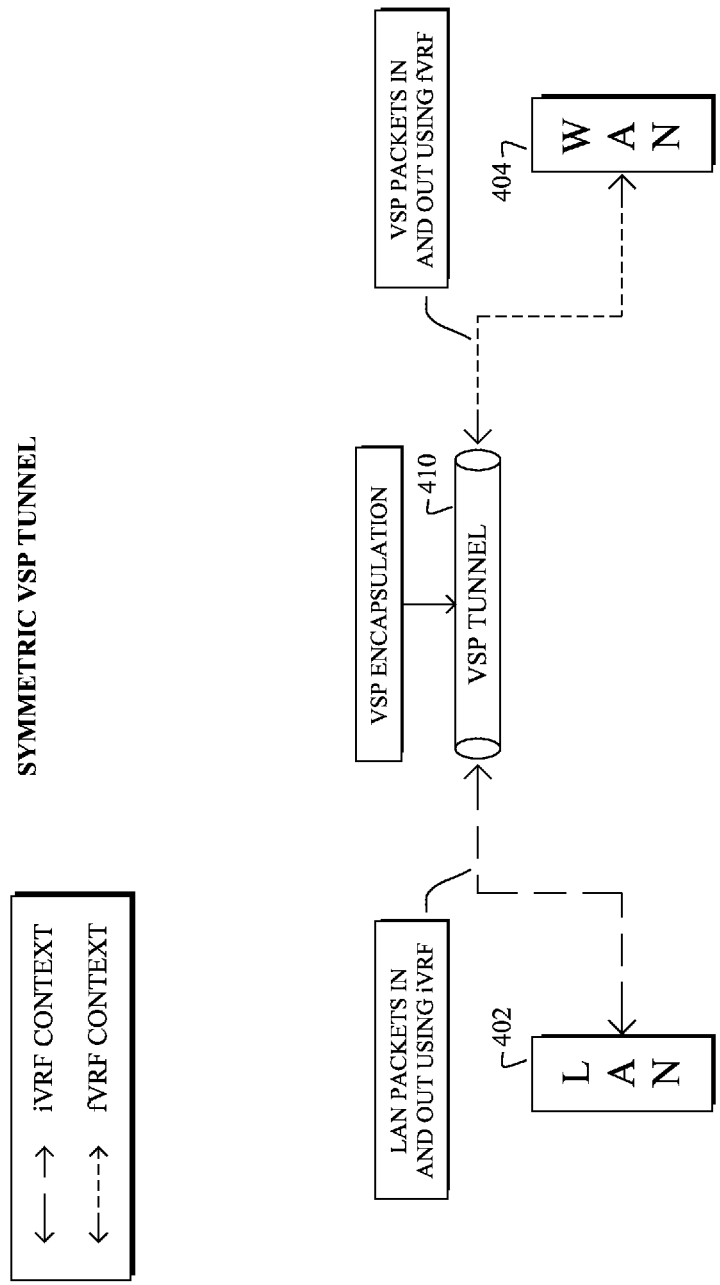

In general, there are two ways that tunneling access to a VSP may be provided: using a bidirectional tunnel or using a unidirectional tunnel. An example of a bidirectional VSP tunnel is shown in FIG. 4B, in some embodiments. As shown, the border device/router may construct a bi-directional tunnel 410 over the ISP to the VSP that connects the devices in LAN 402 with the VSP. For example, as described previously with respect to FIG. 3B, CE-A may build a tunnel 322 between domain 302 and VSP 324.

In the bi-directional case, the transport protocol that is used to "transport" the tunnel packets is supported by the ISP providing the physical connectivity from the EP to the edge of the VSP. The passenger protocol which runs over the tunnel can be any protocol that is supported by the EP and the VSP. The ISP does not need to have any knowledge of, nor need to support, the passenger protocol. Accordingly, the passenger protocol packets may be tunneled both from the EP to the VSP and from the VSP to the EP, since the ISP cannot transport/route/forward these packets directly. In other words, the EP device may send and receive passenger packets to and from the VSP via a tunnel over the ISP, which is effectively symmetric forwarding.

For example, as in the case where the ISP only support IPv4 (e.g., the transport protocol) and the VSP supports IPv6 (e.g., the passenger protocol), tunnel 410 may be constructed as a bi-directional tunnel with the VSP. Similar to the VPN tunnel 406 in FIG. 4A, the device may maintain separate VRF contexts, to separate internal routes within LAN 402 from external routes in WAN 404, which ensures that there is no mixing of routing domains and possible conflicts or complications between these routing domains.

Figure 4C:
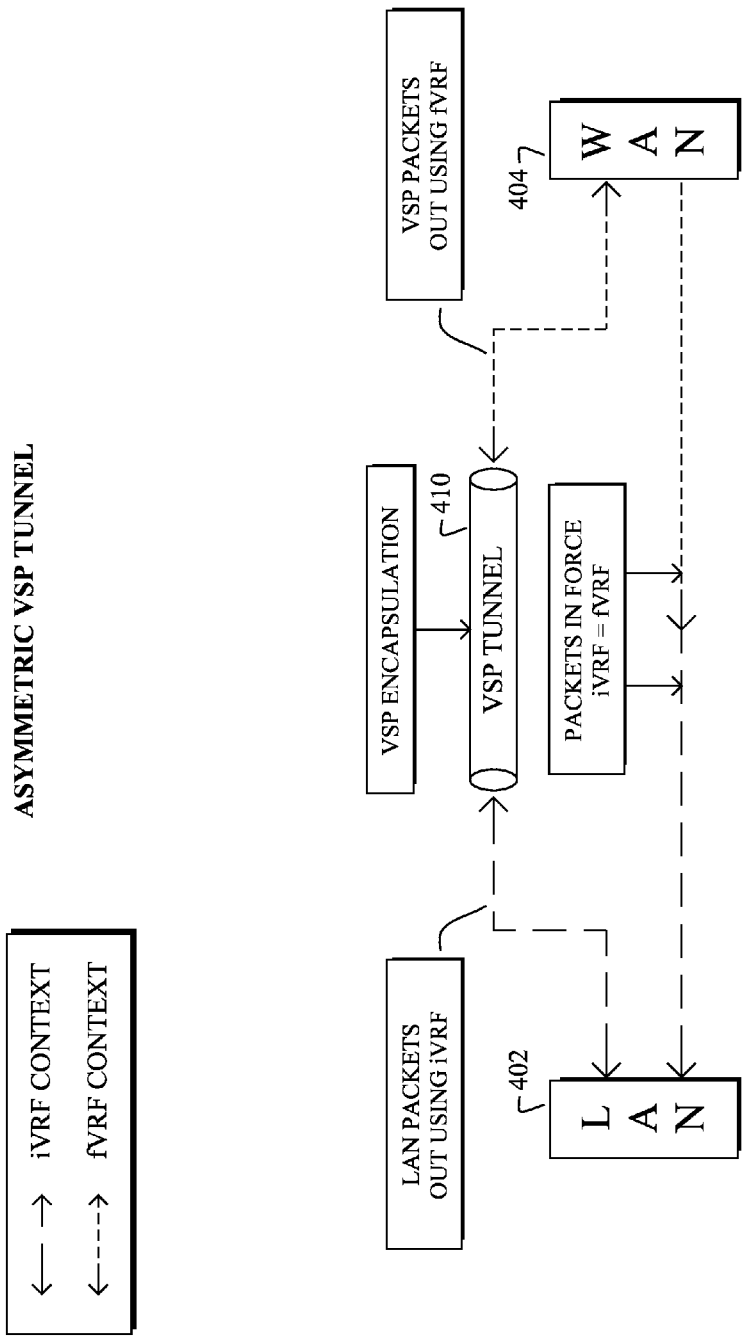

An example of a unidirectional VSP tunnel is shown in FIG. 4C, according to some embodiments. As shown, assume that VSP tunnel 410 is a unidirectional instead of a bi-directional/symmetric tunnel, as in FIG. 4B. In particular, tunnel 410 may instead be built over the ISP from the EP device to the VSP and be used only to send traffic in one direction (e.g., from the EP device to the VSP). As in the example of FIG. 4B, the transport protocol for the tunnel packets that is used to "transport" the tunnel packets may be supported by the ISP providing physical connectivity from the EP device to the edge of the VSP network. However, in the example shown in FIG. 4C, also assume that the passenger protocol which runs over the tunnel is actually supported by both the VSP and the ISP. In this case, the forward direction passenger packets from the EP device will traverse tunnel 410 over the ISP between the EP and the VSP and, in the return direction, the passenger packets may traverse directly over the ISP (e.g., not through tunnel 410) from the VSP edge to the EP device. Thus, when a unidirectional VSP tunnel is used, this is effectively asymmetric forwarding (e.g., for the general forwarding case).

With respect to the routes maintained by the device in the asymmetric case, internal and external routes may be mixed, since the returning packets flowing inward must go directly from the WAN interface to the LAN interface, requiring that both the LAN and WAN interfaces be in the same VRF instance (e.g., iVRF=fVRF). However, possible conflicts and complications may result, since a single routing table between the internal and external routing domains is used.

Further contrasts between the use of symmetric and asymmetric VSP tunnels can be seen with respect to any packet functions or manipulations (e.g., NAT functions, etc.) performed by the ISP on the packets. In the symmetric case, such functions or manipulations may be performed transparently by the ISP, meaning that the EP and VSP do not have, nor need, information regarding these functions or manipulations. Notably, it is the tunnel packet itself that is processed or manipulated, not the passenger packets that are traversing the tunnel over the IPS in both directions between the EP and VSP. In other words, the service provide may only manipulate the tunnel header of the encapsulated packet, leaving the header of the inner packet intact.

In the asymmetric case, however, any packet functions or manipulations performed by the ISP on the tunneled packets between the EP and the VSP may be visible in the sense that there may be an expectation that the packet functions or manipulations by the ISP be undone by the ISP on the return packets. In the outbound direction (e.g., from the EP to VSP), the passenger packets traverse the tunnel over the ISP and, therefore, it is only the tunnel packet itself that is processed/manipulated (e.g., by the NAT function). In the inbound direction, however, (e.g., from the VSP to the EP), the passenger data packet is forwarded directly over the ISP and, therefore, should be processed/manipulated in the opposite manner (e.g., to un-NAT the packet).

Figure 4D:
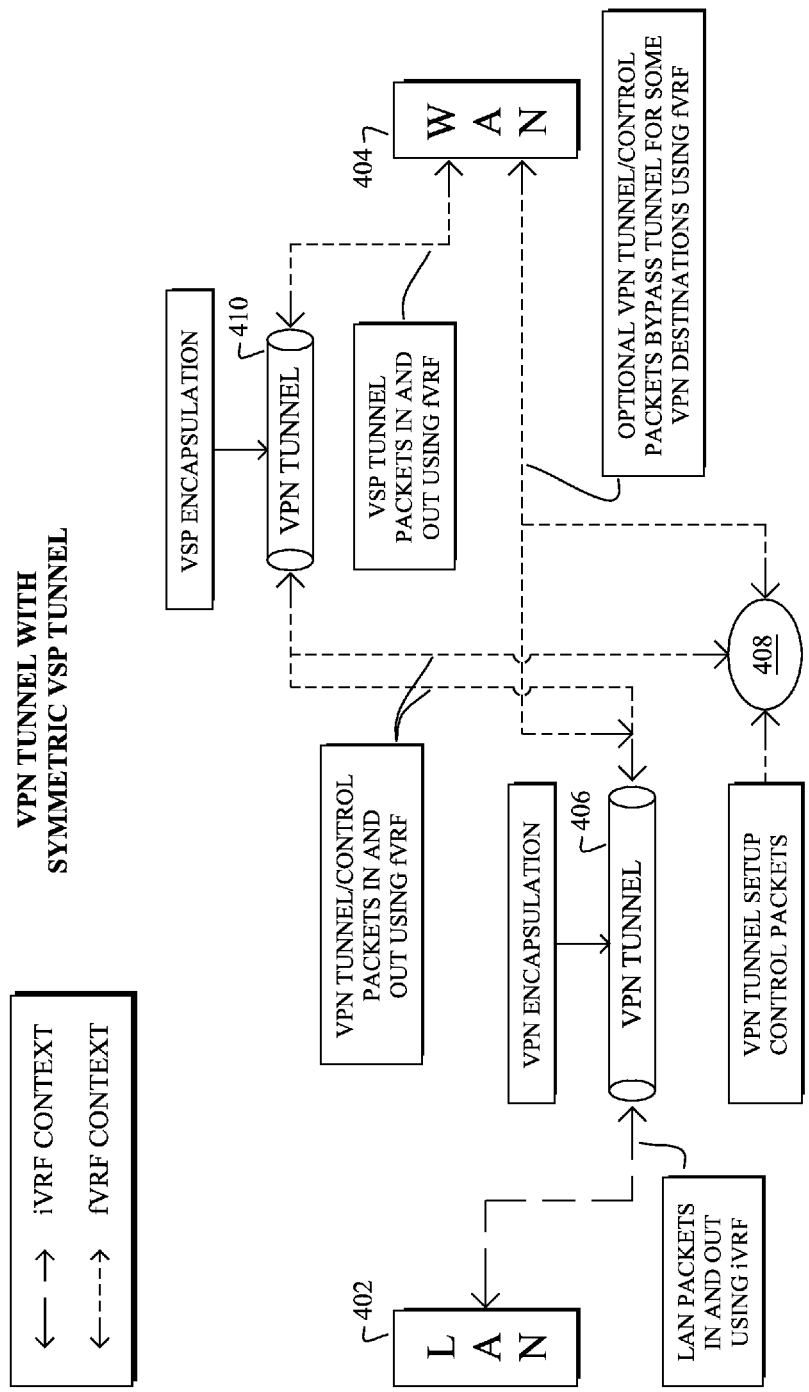

When two EPs communicate with each other using a VPN (e.g., by tunneling between the EPs), and also make use of a VSP, this leads to two potential cases. In the first case, a bidirectional tunnel may be used between the EP and the VSP. For example, as shown in FIG. 4D, VPN tunnel 406 may be encapsulated within VSP tunnel 410 in both directions. If there is a separate VPN control protocol, (e.g., ISAKMF, IKEv2, etc.) for setting up VPN tunnel 406, the VPN setup/control packets 408 may also run over the EP-VSP tunnel in both directions. In other words, there is no need for any interaction between the tunnel control protocols for VPN tunnel 406 and the EP-VSP tunnel 410. This means that neither the VPN tunnel nor the VPN tunnel control protocol is subject to any packet manipulation (e.g., NAT, etc.) that the ISP may perform. Optionally, some traffic may be sent via VPN tunnel 406 between the device and one or more VPN destinations, while still bypassing VSP tunnel 410. For example, only certain types of traffic may be routed through the VSP.

With respect to VRF instances, in the case of a VPN tunnel encapsulated within a symmetric VSP tunnel, internal routes may be kept separate in iVRF from external routes in fVRF. This ensures that no mixing of routing domains is possible, preventing any potential conflicts between the two routing domains. In particular, the VPN tunnel endpoint (e.g., the EP of VPN tunnel 406), the VSP tunnel endpoint (e.g., the EP of VPN tunnel 406), and VPN tunnel redirect through VSP tunnel routes may all share the same fVRF routing table. If the optional VPN tunnel 406 bypass of VSP tunnel 410 is desired (e.g., VPN setup/control packets 408 may bypass VSP tunnel 410), then any redirected VPN routes through the VSP must override the general VPN tunnel endpoint routes, either by being more specific or having a lower administrative distance (AD). In this case, there may be some conflicts or complications when enforcing this in a single (fVRF) routing table.

Figure 4E:
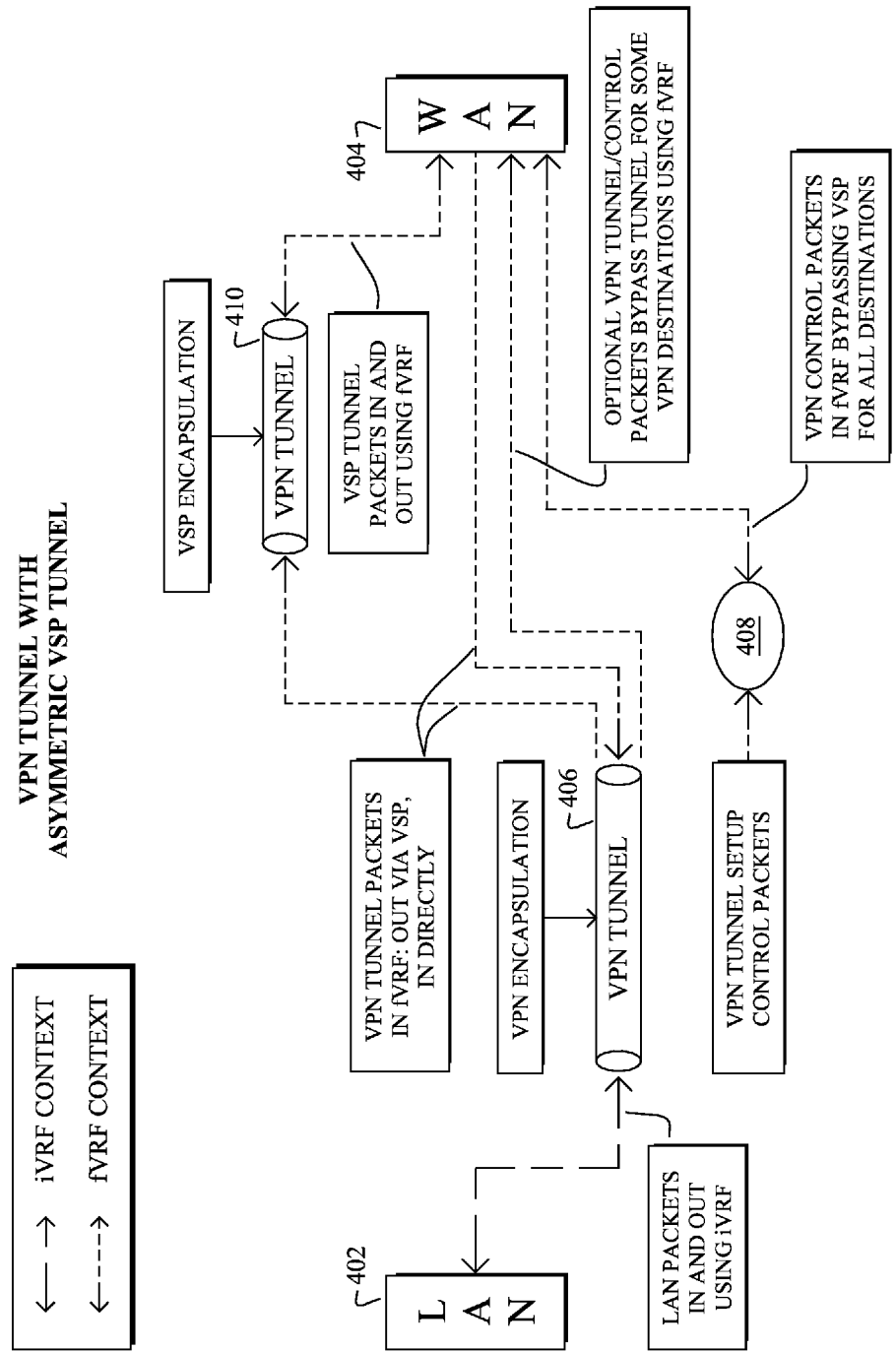

A more complex situation may arise when a unidirectional VSP tunnel is used in conjunction with a VPN tunnel. For example, as shown in FIG. 4E, VSP tunnel 410 may be unidirectional (e.g., to send traffic from the EP to the VSP only), in one embodiment. In the asymmetric case, the EP device may send VPN tunnel packets over VPN tunnel 406 and encapsulated within VSP tunnel 410. However, VPN tunnel packets in the opposite direction may be received directly from the ISP (e.g., not encapsulated within tunnel 410).

If there is a separate VPN control protocol used (e.g., ISAKMP, IKEv2, etc.) for setting up VPN tunnel 406, the VPN tunnel setup/control packets 408 may also run directly over the ISP in both directions (e.g., not through the EP-VSP tunnel 410 at all). In this case, the VPN tunnel control protocol is subject to any ISP packet manipulation (e.g., NAT, etc.) in both directions and the VPN tunnel packets are subject to any ISP packet manipulation only in the inbound direction, since these packets are received directly from the ISP. In the outbound direction, however, the VPN tunnel packets through VPN tunnel 406 are not subject to the same packet manipulation by the ISP, since these packets are further encapsulated within VSP tunnel 410. In other words, the ISP may only manipulate the outer header associated with VSP tunnel 410, leaving the inner header for VPN tunnel 406 untouched.

Certain issues may arise if the border router is using a VSP, depending on how access over the ISP to the VSP is setup. In particular, if the VSP tunnels are configured as bidirectional tunnels, such as in the symmetric case shown in FIG. 4D, this generally means that the traffic flows in both directions over VSP tunnel 410 (e.g., local to remote VSP and VSP remote to local) and any packet manipulation by the ISP (e.g., NAT, etc.) should not present an issue. However, in other situations, such as in the example of FIG. 4E in which VSP tunnel 410 is asymmetric, packets going to the VSP in the outbound direction via VSP tunnel 410 may be handled differently (e.g., contain different header information) from that of the packets in the inbound direction, which may be sent directly over the ISP (e.g., bypassing VSP tunnel 410). Due to any packet manipulation by the ISP, the header information for the outbound VPN packets and inbound VPN packets may differ, presenting a particular problem when a single fVRF routing table is used, due to conflicts.

Figure 5:
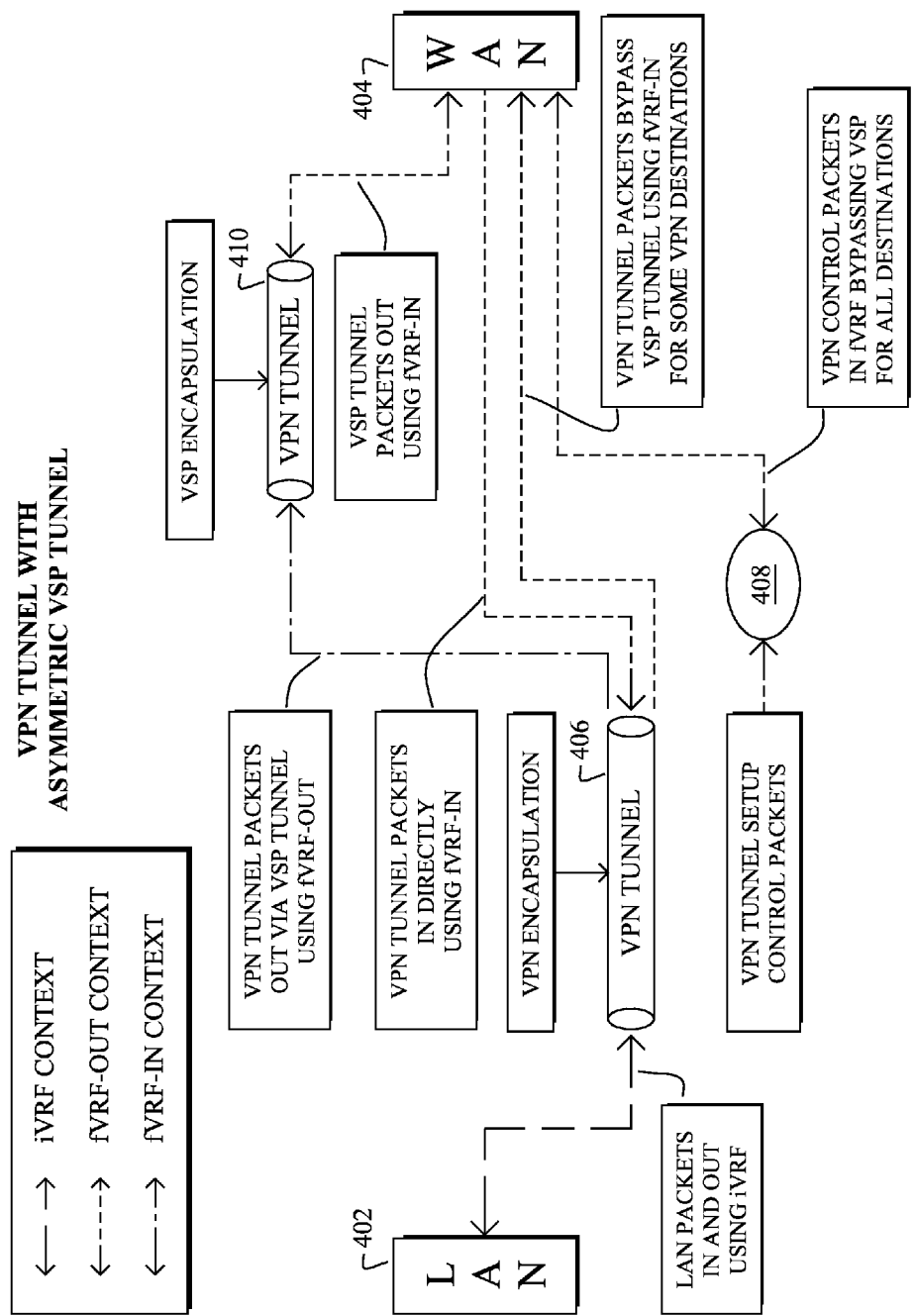
FIG. 5 illustrates an example of a device maintaining separate front door routing tables for asymmetrical tunnels.

Referring now to FIG. 5, an example of a device maintaining separate front door routing tables for asymmetrical tunnels is shown, according to various embodiments. In one embodiment, the fVRF may be separated on the VPN tunnel into an outbound fVRF (fVRF-out) and an inbound fVRF (fVRF-in), to accommodate asymmetrical VSP tunnels. As shown, the fVRF-out context/routing table may be used to redirect outbound VPN tunnel packets via VSP tunnel 410 and on to the remote destination through the VSP (e.g., using fVRF-in). Similarly, the fVRF-in context/routing table may be used to accept VPN tunnel packets arriving directly from the ISP on the external interface, which may also be in the fVRF-in table. In other words, both the fVRF-in and fVRF-out routing tables may include entries for the same interface to the network that is external to LAN 402 (e.g., WAN 404), in one embodiment.

For example, a command line "outbound" key may be used to decouple the fVRF-out instance on the VPN tunnel interface, to match with forwarding out to the VSP tunnel external interface from the fVRF (e.g., "Tunnel VRF VSP Outbound"). This separates the external interface from fVRF-out to be able to use the fVRF-in context configured, for example, with "tunnel VRF ISP." This example establishes a tunnel (illustratively to a VSP) that only enters the tunnel state on the fVRF-out (VSP) context due to the "outbound" key used. As such, the external interface can maintain its routing table entry for fVRF-in (ISP), independently. In other embodiments, an alternative or additional "inbound" command line key may also be used to decouple fVRF-in from fVRF.

As shown, internal routes for LAN 402 may still be kept separate in the iVRF context from that of the external routes for WAN 404 in fVRF, which ensures there is no mixing of routing domains or possible conflicts between routing domains (e.g., LAN 402 and WAN 404). By further splitting fVRF into fVRF-out and fVRF-in, this simplifies the installation and control of routes for using VSP tunnel 410 and prevents potential issues due to packet manipulation by the ISP. In particular, the fVRF-out routing table may be checked first and, if there is a matching route, this route may be selected, and the VPN tunnel packets through VPN tunnel 406 may be sent through VSP tunnel 410 (e.g., using a tunnel-in-tunnel approach). Otherwise, the fVRF-in table may be used and the VPN tunnel packets may be sent out directly, bypassing the VSP. In the inbound direction, the VPN tunnel packets sent directly over the ISP may similarly use the information in fVRF-in. By separating out the routing tables, there is no concern about making sure that the VPN tunnel redirect via VSP tunnel routes will override the VPN tunnel EP routes, since they will always override. Thus, it does not matter whether these routes are more specific (e.g., having a longer mask) or have a smaller AD.

Figure 6:
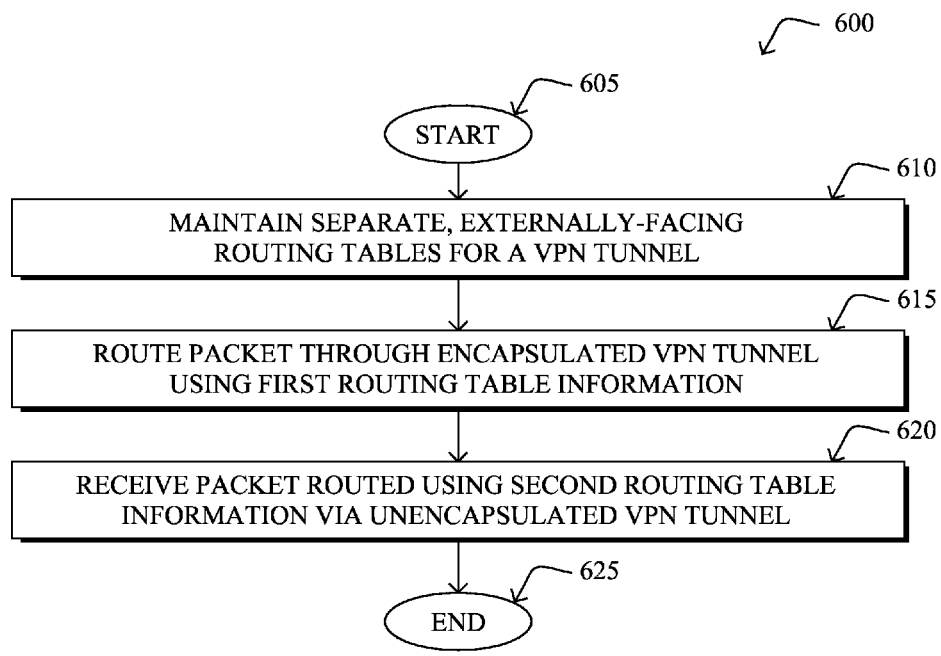
FIG. 6 illustrates an example simplified procedure for providing virtual routing and forwarding for asymmetrical tunnels.

FIG. 6 illustrates an example simplified procedure for providing virtual routing and forwarding for asymmetrical tunnels, according to various embodiments. In general, procedure 600 may be performed by any networking device (e.g., device 200), such as a router or other non-general purpose computing device. Procedure 600 begins at step 605 and continues on to step 610 where, as described in greater detail above, the device may maintain separate, externally-facing routing tables associated with a VPN tunnel. In particular, an fVRF routing table associated with the VPN tunnel and used for purposes of routing decisions external to a particular routing domain (e.g., a LAN for which the device is a border router, etc.) may be split into separate routing tables. For example, the device may maintain an iVRF routing table for purposes of routing traffic within the LAN, an fVRF-out routing table for purposes of routing outbound traffic into a WAN when sending traffic via a tunnel-in-tunnel, and a separate fVRF-in routing table that includes information used to route inbound traffic from the WAN to the device and to send the tunnel-in-tunnel packets.

At step 615, as described in greater detail above, the device may use information in a first of the two separate routing tables to route a packet through the VPN tunnel, which may be encapsulated within a second tunnel. For example, assume that the device maintains an fVRF-out routing table and a separate fVRF-in routing table. In such a case, when routing an outgoing packet from the LAN into the WAN, the device may encapsulate the packet to be sent via the VPN tunnel using the information within the fVRF-out table, if the packet is to be further encapsulated within a second tunnel (e.g., a VSP tunnel). In one embodiment, the device may use the information in the fVRF-in table to encapsulate the VPN-encapsulated packet, thereby forming a tunnel-in-tunnel packet that has an outer header set according to the fVRF-in table. In other words, the device may use the fVRF-out table for purposes of encapsulating packets to be sent via the VPN tunnel, in some cases, while using the fVRF-in table for other routing functions such as encapsulating the VPN-encapsulated packet within a VSP tunnel, processing packets received directly from the WAN that bypass the VSP tunnel, etc. If no matching route is found by the device in fVRF-out (e.g., via the VSP tunnel), the device may instead use the information in the fVRF-in table to go out directly over the ISP, thereby bypassing the VSP tunnel.

At step 620, the device may receive a packet routed to the device using the information in the second routing table, as detailed above. In various embodiments, the received packet may be a VPN-encapsulated packet that was sent directly over the WAN and bypassing the second encapsulating tunnel (e.g., VSP tunnel) in the inbound direction from the WAN to the device. For example, control packets for the VPN tunnel may be sent in a manner that bypasses the second/VSP tunnel and using the information in the fVRF-in table. In doing so, there will not be any conflict between these packets and the VPN packets sent via the VSP tunnel, which may use the information in the fVRF-out table, instead. Procedure 600 then ends at step 625.

It should be noted that while certain steps within procedure 600 may be optional as described above, the steps shown in FIG. 6 are merely examples for illustration and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the use of asymmetric VSP or other tunnel, when forwarding traffic via an inner VPN tunnel. Notably, current techniques using a single fVRF would render most protocols inoperative in these types of tunnel configurations. That is, the disclosed separation of the fVRF on the VPN tunnel from the VRF on the external interface, as well as the simple command line to set the distinction during configuration, will allow for forwarding VPN tunnels via an asymmetrical VSP tunnel. This also allows forwarding of some VPN tunnel endpoints via the asymmetric VSP and other VPN tunnel endpoints directly over the external interface using the same VPN tunnel (multi-point) tunnel interface. Further, the techniques herein also allow for a VPN tunnel between two border routers to start up directly over the external interface via the ISP (e.g., not using the VSP) and to be dynamically redirected to use the VSP, by adding the VPN tunnel endpoint to the out-fVRF table. In some cases, if the VPN tunnel destination is not available in the fVRF-out table, then the fVRF-in table entries may be used (e.g., via the external interface and ISP), to forward the outbound VPN tunnel packet directly (e.g., by not using the VSP).

While there have been shown and described illustrative embodiments that provide for routing using asymmetrical VSP tunnels to communicate VPN traffic in a network, it is to be understood that various other adaptations and modifications may be made within the spirit and scope of the embodiments herein. For example, the techniques herein may be adapted for use with traffic encapsulated within any number of tunnels and/or using any number of different tunneling techniques. Additionally, the protocols discussed herein are exemplary only and other protocols may be used within the scope of the teachings herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
maintaining, by a device in a network, first and second routing tables associated with a virtual private network (VPN) tunnel, wherein the first and second routing tables are separate routing tables and each comprise routing information used to route packets external to a particular routing domain;
routing, by the device, a first packet in the network via the VPN tunnel and a second tunnel that encapsulates the VPN tunnel, using the routing information in the first routing table, wherein the VPN tunnel and the second tunnel are asymmetrical tunnels and the second tunnel is a tunnel between the device and a virtual service platform (VSP); and
receiving, at the device, a second packet via the VPN tunnel, wherein the second packet was routed to the device using the routing information in the second routing table and bypasses the second tunnel.

2. The method as in claim 1, wherein the VSP device is operable to perform, in response to receiving the first packet, at least one of: a security operation, an analytics operation, or a content caching operation.

3. The method as in claim 1, further comprising:
communicating, between the device and an endpoint of the VPN tunnel, one or more control packets for the VPN tunnel using the routing information in the second routing table and bypassing the second tunnel.

4. The method as in claim 1, further comprising:
maintaining, by the device, a third routing table associated with the VPN tunnel, wherein the third routing table comprises routing information used to route packets inside of the particular routing domain.

5. The method as in claim 4, further comprising:
receiving, at the device, the first packet routed to the device using the routing information in the third routing table.

6. The method as in claim 1, wherein routing, by the device, the first packet in the network via the VPN tunnel and a second tunnel that encapsulates the VPN tunnel comprises:
encapsulating, by the device, the first packet into a VPN-encapsulated packet using the routing information in the first routing table; and
encapsulating, by the device, the VPN-encapsulated packet within the second tunnel using the routing information in the second routing table.

7. The method as in claim 1, further comprising:
routing, by the device, a third packet via the VPN tunnel and bypassing the second tunnel using the routing information in the second routing table.

8. The method as in claim 1, further comprising:
determining, by the device, that the third packet should bypass the second tunnel based on at least one of: a destination of the third packet, a source of the third packet, or a type associated with the third packet.

9. An apparatus, comprising:
one or more network interfaces to communicate with a computer network;
a processor coupled to the one or more network interfaces and configured to execute a process; and a memory configured to store the process executable by
the processor, the process when executed operable to:
maintain first and second routing tables associated with
a virtual private network (VPN) tunnel, wherein the
first and second routing tables are separate routing
tables and each comprise routing information used to
route packets external to a particular routing domain;
route a first packet in the network via the VPN tunnel
and a second tunnel that encapsulates the VPN
tunnel, using the routing information in the first
routing table, wherein the VPN tunnel and the second tunnel are asymmetrical tunnels and the second
tunnel is a tunnel between the apparatus and a virtual
service platform (VSP); and
receive a second packet via the VPN tunnel, wherein
the second packet was routed to the apparatus using
the routing information in the second routing table
and bypasses the second tunnel.

10. The apparatus as in claim 9, wherein the VSP is operable to perform, in response to receiving the first packet, at least one of: a security operation, an analytics operation, or a content caching operation.

11. The apparatus as in claim 9, wherein the process when executed is further operable to:
communicate, between the apparatus and an endpoint of the VPN tunnel, one or more control packets for the VPN tunnel using the routing information in the second routing table and bypassing the second tunnel.

12. The apparatus as in claim 9, wherein the process when executed is further operable to:
maintain a third routing table associated with the VPN tunnel, wherein the third routing table comprises routing information used to route packets inside of the particular routing domain.

13. The apparatus as in claim 12, wherein the process when executed is further operable to:
receive the first packet, wherein the first packet was routed to the apparatus using the routing information in the third routing table.

14. The apparatus as in claim 9, wherein the apparatus routes the first packet in the network via the VPN tunnel and a second tunnel that encapsulates the VPN tunnel by:
encapsulating the first packet into a VPN-encapsulated packet using the routing information in the first routing table; and
encapsulating the VPN-encapsulated packet within the second tunnel using the routing information in the second routing table.

15. The apparatus as in claim 9, wherein the process when executed is further operable to:
route a third packet via the VPN tunnel and bypassing the second tunnel using the routing information in the second routing table.

16. The apparatus as in claim 9, wherein the process when executed is further operable to:
determine that the third packet should bypass the second tunnel based on at least one of: a destination of the third packet, a source of the third packet, or a type associated with the third packet.

17. A tangible, non-transitory, computer-readable media having software encoded thereon, the software when executed by a processor on a device in a computer network operable to:
maintain first and second routing tables associated with a virtual private network (VPN) tunnel, wherein the first and second routing tables are separate routing tables and each comprise routing information used to route packets external to a particular routing domain;
route a first packet in the network via the VPN tunnel and a second tunnel that encapsulates the VPN tunnel, using the routing information in the first routing table, wherein the VPN tunnel and the second tunnel are asymmetrical tunnels and the second tunnel is a tunnel between a device and a virtual service platform (VSP); and
receive a second packet via the VPN tunnel, wherein the second packet is routed to the device using the routing information in the second routing table and bypasses the second tunnel.

* * * * *